UNITED STATES PATENT OFFICE.

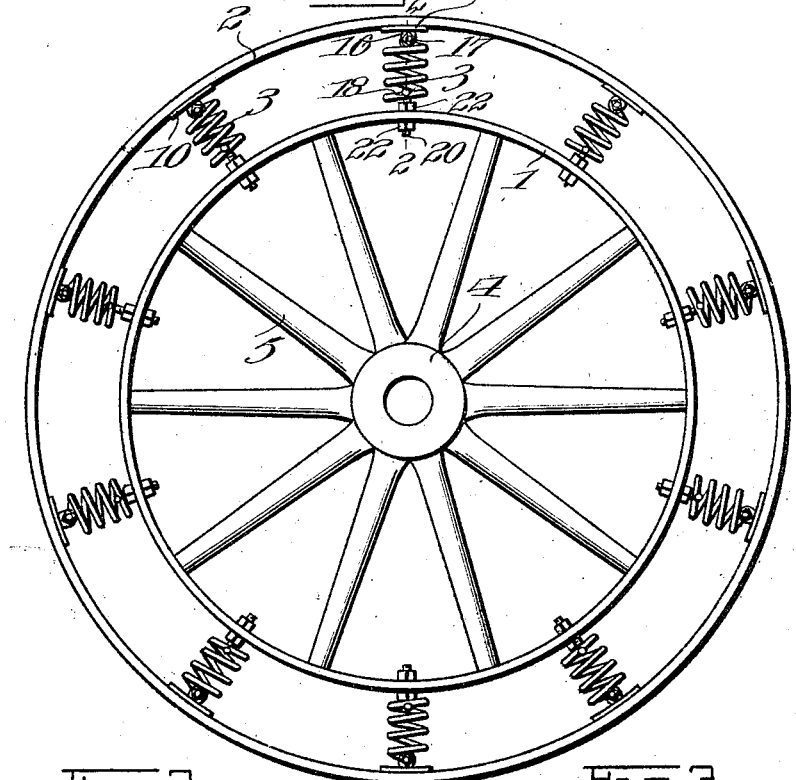

HILDING AURELIUS BJORKLUND, OF TRAVERSE, MINNESOTA.

VEHICLE-WHEEL.

1,053,000.　　　　　　　　Specification of Letters Patent.　　Patented Feb. 11, 1913.

Application filed April 1, 1912. Serial No. 687,683.

*To all whom it may concern:*

Be it known that I, HILDING A. BJORK-LUND, a citizen of the United States, residing at Traverse, in the county of Nicollet and State of Minnesota, have invented new and useful Improvements in Vehicle-Wheels, of which the following is a specification.

This invention relates to vehicle wheels.
An object of the invention is to provide a device of this kind which will possess such structural features as will render the wheel extremely elastic and permit of its being used satisfactorily as a substitute for wheels employing cushioning members such as pneumatic tires or the like.

Another object of the invention is to provide concentric members and springs interposed between the members and yieldingly connecting them together and so associated with the members that they can be readily disconnected therefrom or connected therewith as the occasion may demand.

In the drawing forming a portion of this application and in which like letters of reference indicate similar parts in the several views:—Figure 1 is a side view of the wheel. Fig. 2 is a section therethrough taken on line 2—2 of Fig. 1. Fig. 3 is a section taken on line 3—3 of Fig. 2.

The wheel comprises spaced inner and outer concentric slightly resilient members 1 and 2 which are yieldingly connected together by radially disposed devices 3 which are interposed between the members as clearly shown in Figs. 1 and 2 of the drawing. The inner member includes a suitable hub 4 and radial spokes 5. The cushioning elements 3 are each in form of a heavy spring whose outer terminal is threaded as at 6 and extended through a detachable retaining device 7. The retaining devices are provided with inner rectangular heads 8 which are seated in correspondingly formed recesses 9 in the outer member 2 of the wheel, the said heads being operatively retained in the recesses by means of plates 10. These plates are provided with slots 11 through which the inwardly extending shank like portions of the members 7 extend. Fastening screws or other suitable equivalent fastening devices 12 are employed with a view to holding the plates 10 securely connected with the member 2.
The shanks of the member 7 are provided with lugs 13 having substantially beveled surfaces 14 which are spaced from the plates 10 so as to form intervening wedge recesses therebetween for the reception of wedges 15. These wedges are formed integral with washers 16 which are adjustable upon the threaded extremities of the springs. Adjusting nuts 17 upon the threaded extremities of the springs serve to hold said extremities operatively connected with the members 7 and they also serve to force the wedges 15 into the wedge spaces hereinbefore described to hold the retaining device 7 firmly connected with the member 2 and to prevent said member 7 from vibrating. By holding the members 7 against rotation the springs 3 are relieved of undue torsion as will be readily understood.

The inner convolutions or terminals of the springs 3 are provided at diametrically opposite points with recesses 18 which receive the oppositely extending lugs 19 of the adjusting bolts 20. These adjusting bolts extend through radial passages 21 in the inner member 1 of the wheel. Clamping nuts 22 upon the bolts 20 are designed to engage against the opposite sides of the member 1 whereby the bolts are securely held in their adjusted positions. The member 2 may be made of spring steel if desired, likewise the member 1 whereby the wheel is afforded greater elasticity.

From the construction of the device described it is evident that the device is comparatively simple, it may be manufactured at a relatively low cost and is found most desirable as a substitute for cushioning wheels employing such destructible surfaces as pneumatic tires or the like. The cushioning devices 3 of the wheel may be adjusted and the devices brought under any desired tension as to the load to be supported by the wheel.

I claim:—

A wheel comprising spaced inner and outer members, devices extending radially of the wheel and detachably connected with the outer member and having passages therein, springs interposed between the said inner and outer members and having threaded outer terminals extending through the passages in said devices, wedges interposed between the devices and the said outer members and adjustable upon the said threaded terminals of the springs, nuts bearing behind the wedges and adjustable on the threaded portions of the springs, and adjustable devices carried by the inner member and having detachable engagement with the inner terminals of the springs.

In testimony whereof I affix my signature in presence of two witnesses.

HILDING AURELIUS BJORKLUND.

Witnesses:
JOHN WEBSTER,
WM. MALLGREN.